United States Patent [19]

Carl

[11] 4,416,928

[45] Nov. 22, 1983

[54] COVER STRUCTURE

[76] Inventor: Heinz Carl, D-8644, Pressig, Fed. Rep. of Germany

[21] Appl. No.: 376,606

[22] Filed: May 10, 1982

[30] Foreign Application Priority Data

Oct. 23, 1981 [DE] Fed. Rep. of Germany ....... 3142149
Feb. 16, 1982 [DE] Fed. Rep. of Germany ....... 3205383

[51] Int. Cl.³ .......................... B32B 3/24; E04C 2/00
[52] U.S. Cl. .................................... 428/38; 47/28 R; 52/63; 404/70; 428/256; 428/913
[58] Field of Search ................. 428/38, 255, 256, 913; 156/84, 85, 86; 52/63; 404/70; 264/DIG. 71; 206/497; 47/26, 28, 29, 31

[56] References Cited

U.S. PATENT DOCUMENTS

| 1,580,287 | 4/1926 | Colle et al. ............................ 428/38 |
| 1,842,093 | 1/1932 | Haver ..................................... 428/38 |
| 2,545,981 | 3/1951 | Warp ................................. 428/38 X |
| 3,194,959 | 7/1965 | Bashaw et al. ................. 428/913 X |
| 3,297,461 | 1/1967 | Siddall ............................ 428/256 X |
| 3,310,453 | 3/1967 | Lappala et al. ................. 428/256 X |
| 3,519,530 | 7/1970 | Strube, Jr. ...................... 428/913 X |
| 3,929,226 | 12/1975 | Nijs ................................. 206/497 X |
| 4,139,099 | 2/1979 | Daly et al. ....................... 428/913 X |
| 4,145,855 | 3/1979 | Sheldon .......................... 428/255 X |
| 4,170,675 | 10/1979 | Greengrass ..................... 428/256 X |

Primary Examiner—Henry F. Epstein
Attorney, Agent, or Firm—James E. Nilles

[57] ABSTRACT

Described is a universally usable and durable cover structure formed of a framing and a flexible plastic sheet. The framing consists of a metal grid structure onto which the flexible plastic sheet is shrunk or welded. In a preferred embodiment shown in FIG. 3, a thinner and closer-meshed mesh structure overlays the grid structure 1. This embodiment employs an upper and a lower plastic sheet 2a and 2b, respectively, connected to one another in such a manner that the grid structure and mesh structure are sealingly enclosed therebetween. Further described are preferred uses of the cover structure as for the construction of water retention structures.

7 Claims, 7 Drawing Figures

COVER STRUCTURE

BACKGROUND

This invention relates to a cover structure. It relates further to preferred methods of employ of such cover structure.

Known for employ in horticulture are hotbed covers consisting of a metal carrier frame covered by a flexible plastic sheet. The erection of such hotbed covers is rather fastidious, requiring the plastic sheet to be fastened separately. In addition, their range of employ is rather restricted, as their shape is rigidly determined by the shape of the carrier frame. These hotbed covers are moreover not particularly durable, as the plastic sheet is supported by the carrier frame only at widely spaced intervals.

In the construction of water retaining structures such as dams and the like it is also known to cover the dam core flanks with a simple plastic sheet serving as a sealing layer. The plastic sheet is usually supplied in the form of wound rolls and applied to the embankment in the form of continuous overlapping webs. Subsequently a covering layer is applied over the sheeting in order to protect it and to retain it on the embankment. In this method it has to be considered disadvantageous, however, that the sheeting tends to slip due to the slope of the embankment or under the influence of wind. A further disadvantage is to be seen in the fact that the sheeting is easily damaged by stones contained in the material of the core or the covering layer, whereby its function as a sealing layer is defeated.

SUMMARY OF THE PRESENT INVENTION

It is an object of the present invention to provide a cover structure that is suitable for universal use in any desired configuration while being more durable and easier to handle than known cover structures.

This object is attained according to the invention by the features set forth in the characterizing clause of the main claim.

The claimed construction of the cover structure consisting of a metal grid structure and a plastic sheet fixedly attached thereto permits the cover structure to be bent to any desired shape. In comparison to prior art, the plastic sheet is supported at closely spaced intervals, whereby the entire cover structure is more durable. As the plastic sheet is fixedly shrunk onto the grid structure, it does not offer any points of attack to winds.

The durability may be further improved by interposing a mesh structure between the grid structure and the sheet shrunk thereonto. The mesh structure is effective to reinforce the plastic sheet so that it is practically impossible to pierce the cover structure.

Depending on the static forces to be absorbed, the grid structure may be formed with larger or smaller openings.

The plastic sheets shrunk onto both sides of the grid structure provides exceptionally good protection against corrosion and thus contributes to increased durability of the cover structure.

Bonding of the two sheets by welds at the openings of the grid structure results in improved coherence and permits the cover structure to be cut to any individual need.

Although the grid structure is bendable, it has sufficient inherent stiffness to permit the cover structure to be employed as a self-supporting roof structure.

The cover structure may be employed as a simple and cost-effective roof structure adapted to cover relatively large spans without additional support.

The employ of the cover structure in a flat form as a sealing layer in the construction of water retaining structures ensures that slippage of the sealing layer is prevented, that increased safety against damage to the sealing layer is obtained by the reinforcement included in the compound material and that the construction is facilitated, resulting in reduced labour costs.

Labour and expense may be further reduced by applying the cover structure in the form of continuous webs.

The invention shall now be described in detail with reference to the accompanying drawings, wherein:

FIG. 1 shows a partially sectioned view of a cover structure in an embodiment of the invention, FIG. 2 shows a cover structure according to the invention in the form of a tunnel, formed with two plastic sheets with a mesh structure therebetween, FIG. 3 shows a cover structure according to the invention having a predetermined bending line, FIG. 4 shows a perspective view of a cover structure in flat configuration, FIG. 5 shows a sectional view along the line V—V in FIG. 4, FIG. 6 shows a cross-sectional view of a water retaining dam, and FIG. 7 shows a cover structure resting on support members.

DESCRIPTION OF THE PREFERRED EMBODIMENT

Figure 1:
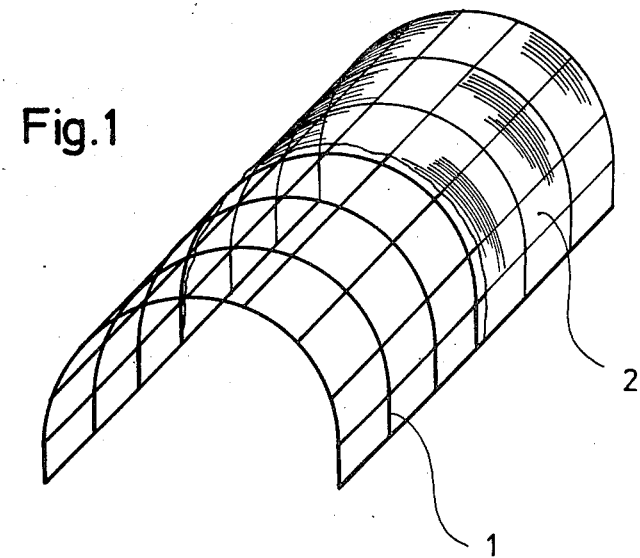

Shown in FIG. 1 is a tunnel-shaped cover structure consisting of a grid structure 1 and a flexible plastic sheet 2 shrunk thereonto. Grid structure 1 is formed of intersecting bendable metal rods. Plastic sheet 2 is a commercially available translucent shrinkable sheet. Shrinkable sheet, as the name implies, is plastic sheet material which has been previously stretched in fabrication and which, upon being heated, shrinks back to its original condition.

The cover structure may be formed by bending grid structure 1 to the desired shape, whereafter plastic sheet 2 is heat-shrunk onto the grid structure. As an alternative, plastic sheet 2 may be shrunk onto grid structure 1 in flat configuration, whereafter the completed cover structure is bent to the desired shape.

Figure 2:
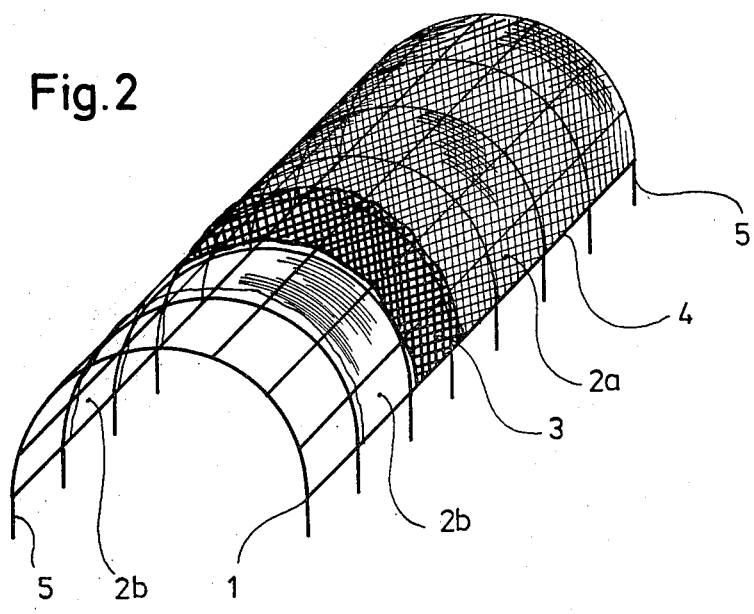

FIG. 2 shows a cover structure of substantially the same tunnel shape. The cover structure consists again of a grid structure 1 and, in this case, two plastic sheets 2a and 2b. Interposed between grid structure 1 and the upper plastic sheet 2a, which is exposed to atmospheric effects, is a mesh structure 3. Mesh structure 3 is substantially thinner and of narrower mesh than grid structure 1. Sheets 2a and 2b are welded to one another and shrunk along their edges 4 and over the entire surface between the openings of the grid structure and mesh structure, respectively, so that grid structure 1 and mesh structure 3 are hermetically sealed therebetween. The dimensions of sheets 2a and 2b and the location of weld seams 4 are preferably selected such that rod ends 5 of grid structure 1 project beyond sheets 2a and 2b and mesh structure 3 at the longitudinal edges of the cover structure. Projecting rod ends 5 permit the cover structure to by anchored in the soil in a simple manner.

Figure 3:
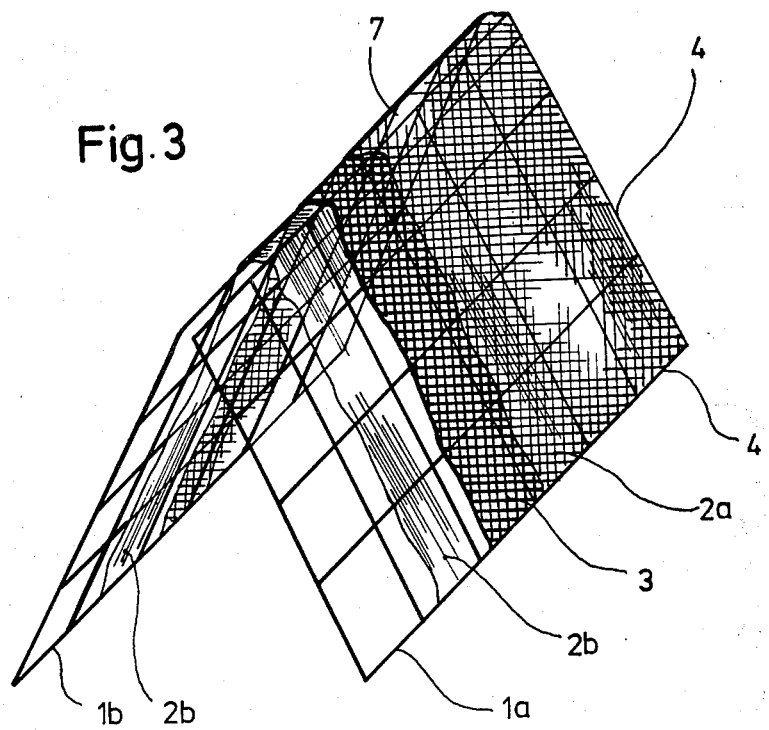

FIG. 3 shows an embodiment of an angularly bent cover structure having a relatively stiff grid structure 1. The walls of the cover structure are thus formed of two sections 1a and 1b of grid structure 1. Both grid structure sections 1a, 1b are covered by a continuous web of mesh structure 3 and sealed between the two sheets 2a and 2b. The connection between the two grid structure sections 1a and 1b is accomplished solely by mesh structure 3 and the two sheets 2a, 2b which are more easily bendable than grid structure 1. There is thus formed a predetermined fold line 7 permitting the cover structure to be erected in the shape of a roof with any desired ridge angle.

Figure 4:
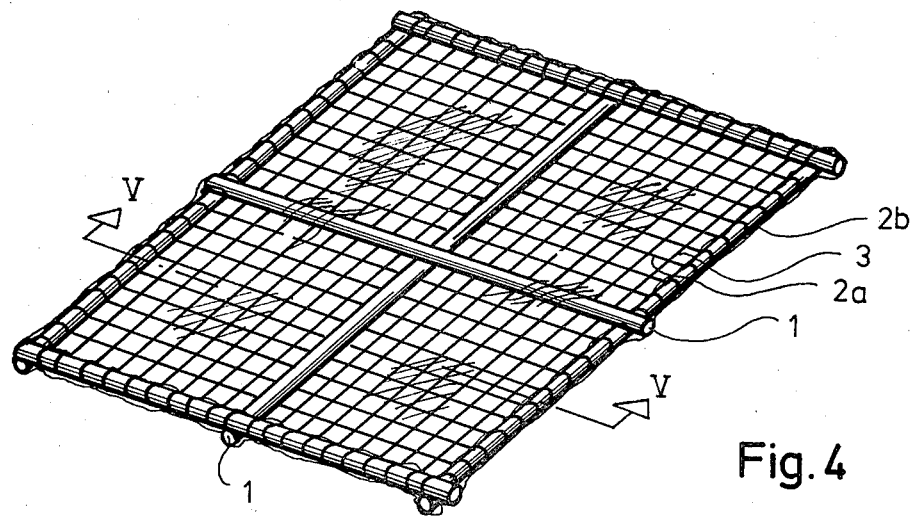

Shown in FIG. 4 is a cover structure in the form of a flat panel. Its construction corresponds to that shown in FIGS. 2 and 3, comprising grid structure 1, mesh structure 3 and two plastic sheets 2a, 2b.

Figure 5:
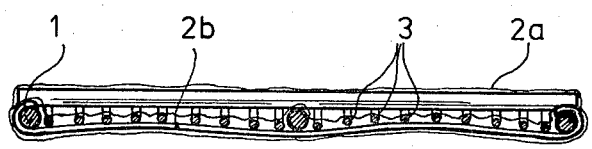

FIG. 5 shows a cross-sectional view along the line V—V in FIG. 4. In this figure it is seen that sheets 2a, 2b are welded to one another at the openings of grid structure 1 and mesh structure 3, whereby the latter two are closely enveloped and sealed therebetween.

Figure 6:
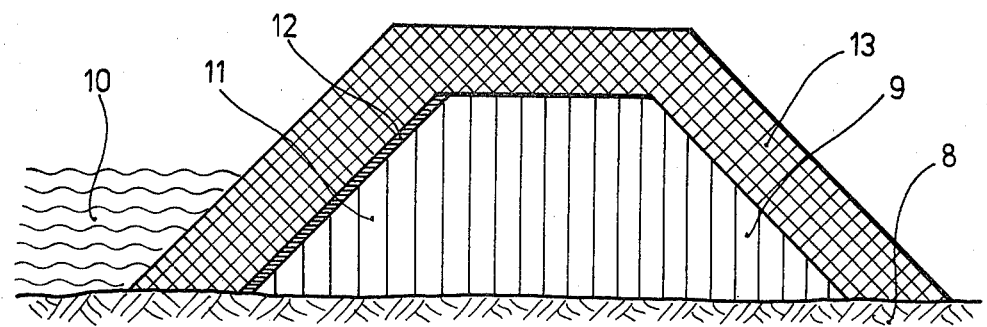

Shown in FIG. 6 is a cross-sectional view of a water retaining dam. This dam may be a sea wall, a river dam or the shore of an artificial lake, and comprises a core 9 of soil, loam or gravel, the height of which above ground 8 has to be greater than the highest water level to be expected. A slope 11 of core 9 facing towards the water 10 is covered by a sealing layer 12. Sealing layer 12 consists of a cover structure corresponding to one of the above-described embodiments, which is laid onto slope 11 in the form of large rectangular panels or as a continuous web. A cover layer 13 of soil or the like may then be spread on sealing layer 12, with the weight and strength of the cover structure preventing slippage or damage of the sealing layer.

Figure 7:
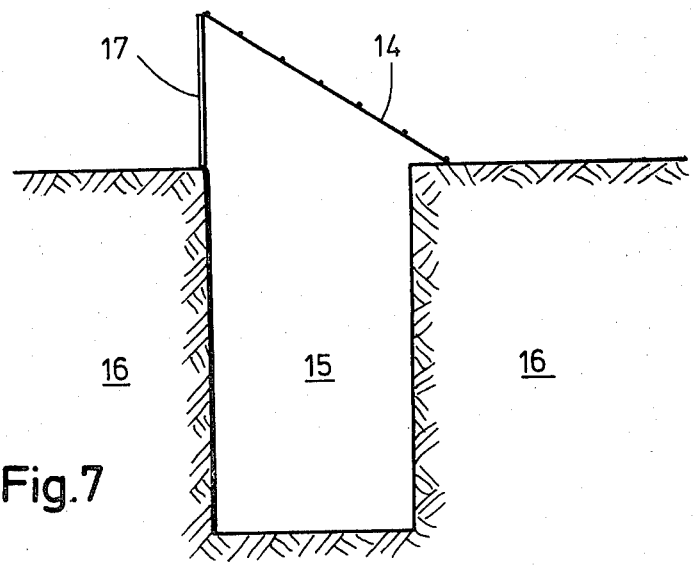

FIG. 7 shows a further example of the versatile uses of the cover structure in a flat configuration. A cover structure of the type shown in FIG. 4 is employed as a roof 14 over a trench 15. One side of roof 14 rests on the ground 16 surrounding trench 15. The other side rests on support members 17. Support members 17 may themselves be formed of narrow strips of the cover structure. Roof 14 may be covered with soil and/or snow if so desired.

The cover structure of FIG. 1 may be formed by spreading plastic sheet 2 on pre-shaped grid structure 1 and fixedly attaching it thereto. The attaching step may be carried out by shrinking and/or glueing, by welding or by employing mechanical fastening means such as staples or binding wire.

The cover structure shown in FIGS. 2 to 7 is preferably formed by spreading sheet 2b on a conveyor belt, followed by overlaying it with a single grid structure 1 or two juxtaposed grid structure sections 1a, 1b, mesh structure 3 and finally, sheet 2a. The named materials are preferably supplied in a continuous manner such as by being unwound from a supply roll. The conveyor belt conveys the superimposed web materials through a shrinking and welding apparatus, wherein the plastic sheets are softened by heating and compressed by suitable means, so that they are welded to one another at their longitudinal edges and within the openings of the mesh and grid structures while being simultaneously shrunk. The continuous web of the finished cover structure may be wound onto a roll or cut to sections of any desired dimensions, which may then be bent to any desired shape.

Grid structure 1 is formed of ribbons or rods intersecting or interwoven at any desired angle. The cross-sectional shape of the ribbons or rods as well as the mesh size of grid structure 1 are selected in accordance with the required static strength. Suitable materials are mainly structural steel or aluminum and alloys thereof. It is also possible, however, to employ plastic grid structures formed as by injection molding for the embodiments shown in FIGS. 3 to 7.

Plastic sheet 2 is a conventional shrinkable sheet of the type commercially available in various thicknesses and various degrees of translucence as required by any particular use.

Mesh structure 3 may be any metal or plastic webbing of any configuration. Grid structure 1 is effective to support mesh structure 3 in such a manner that the latter is not subjected to any appreciable tension or compression forces during shrinking of the plastic sheets or during later use. The thickness of mesh structure 3 is thus solely dictated by the expected bending forces, i.e. by the transverse forces to be absorbed during use, and by the required degree of translucence.

The invention is not restricted to the embodiments described and shown in the drawings. The characteristic features of these embodiments may readily be interchanged. The tent or gable roof of FIG. 3 may thus also be provided with the projecting rod ends 5. The form to which the cover structure is bent may also be varied. The embodiment of FIG. 3 may thus be formed of three grid structure sections, resulting in two predetermined fold lines permitting the cover structure to be erected in a channel-shaped cross-sectional configuration. The tunnel-shaped cover structures may be employed, provided they are of the proper size, for erecting igloo-type shelters, as they are perfectly able to support the weight of soil and/or snow spread thereon as a covering layer.

In their flat shape, the cover structures may be used as portable makeshift shelters as for expeditions and the like.

The cover structure of FIG. 6 is suitable for employ not only for sealing embankments but also for sealing the bed of a water body.

Further uses are imaginable in agriculture and in the construction industry, as for instance for lining underground silos or for temporarily sealing door and window openings of buildings under construction.

I claim:

1. A cover structure comprising:
  A. a substantially rigid grid-like frame structure comprising two sets of rod-like members, the rod-like members of each set being in spaced apart substantially parallel relation to one another and in crosswise relation to the members of the other set; and
  B. a pair of shrinkable plastic sheets, each covering one side of said frame structure and adhered thereto, said sheets
     (1) cooperating to substantially enclose the frame structure,
     (2) being shrunk to be under edgewise tension between the members of the frame structure, and
     (3) being bonded flatwise to one another through the spaces between the members of the frame structure.

2. The cover structure according to claim 1, further characterized by:

C. a mesh structure flatwise interposed between said frame structure and one of said shrinkable plastic sheets, to be enclosed with the frame structure by said plastic sheets and through the interstices of which said plastic sheets are flatwise bonded to one another.

3. The cover structure of claim 2, characterized in that: said frame structure comprises bendable metal rods spaced apart at first distances; and said mesh structure comprises filaments substantially thinner than said metal rods and spaced apart at smaller distances.

4. A cover structure according to claim 1 characterized by its employ in a bent configuration as a self-supporting roof structure.

5. A cover structure according to claim 1 characterized by its employ in a flat shape as a roof structure (14) resting on support members (17).

6. A cover structure according to claim 1 characterized by its employ in a flat shape as a sealing layer in the construction of water retaining structures.

7. A cover structure according to claim 6, characterized by its employ in the form of continuous webs.

* * * * *